(No Model.)

A. C. FISH.
ROAD CART.

No. 321,806. Patented July 7, 1885.

Witnesses:

Inventor:
Abner C. Fish
By
Stout & Underwood,
Attorneys.

UNITED STATES PATENT OFFICE.

ABNER C. FISH, OF RACINE, WISCONSIN, ASSIGNOR TO M. L. FISH, OF SAME PLACE.

ROAD-CART.

SPECIFICATION forming part of Letters Patent No. 321,806, dated July 7, 1885.

Application filed August 7, 1883. (No model.)

*To all whom it may concern:*

Be it known that I, ABNER C. FISH, of Racine, in the county of Racine, and in the State of Wisconsin, have invented certain new and useful Improvements in Road-Carts; and I do hereby declare that the following is a full, clear, and exact description thereof.

My invention relates to road-carts, and will be fully described hereinafter.

Figure 1:
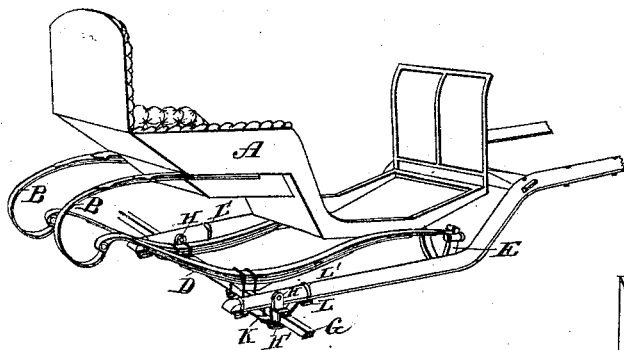
Figure 3:
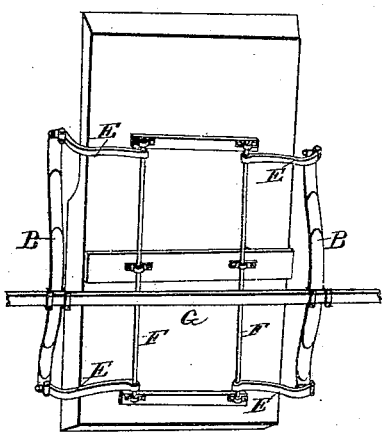
Figure 2:
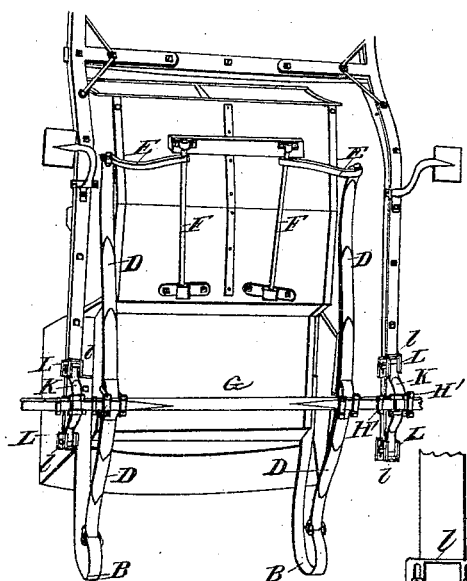
Figure 4:
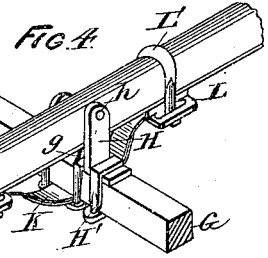
Figure 5:
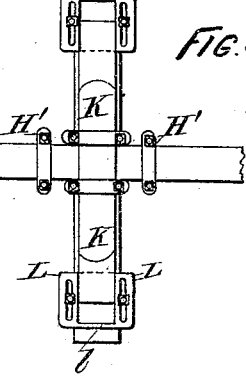

In the drawings, Figure 1 is a perspective view of my improved cart. Fig. 2 is a bottom view, partly in perspective. Fig. 3 is a bottom view of a modification of my cart, and Figs. 4 and 5 are details.

A is the body of my cart.

B, Figs. 1 and 2, are C-springs that project rearward from the body, their rear ends joining semi-elliptic springs D.

E are arms that connect the front ends of the semi-elliptic springs with the torsion-springs F, that are firmly secured to the under side of the body. The semi-elliptic springs are clipped directly to the axle, and just outside of them I clip the shafts to the axle, as shown in Fig. 4, wherein, as in the other figures, G is the axle, upon which are secured two lugs, g, which are rounded on their upper sides. These lugs are placed one just outside of each spring D, and form fulcrums for the shafts, the ends of which project about ten inches back beyond them.

H are ears, which are clipped to the axle and project up to receive bolts h, which hinge the rear ends of the shafts to the axle.

K K are springs, one of which is clipped to the axle just beneath each lug, and each end of these springs projects up into a slotted guide, L, which is secured in place by a clip, L', in such a manner that the ends of the springs may constantly bear against the under side of the shafts, and the play of the shafts is limited by ribs l, that project from one side to the other of the guides L. The ears H are shown as secured to the axle by extra clips, H'; but their securing-flanges may be inwardly extended and secured by the same clips that hold the shaft-springs in place. As the guides L are slotted, they may be moved in and out after the nuts of their clips have been loosened, to reduce or increase the play of the shaft-springs at either end, and the height of the shafts is regulated by moving the springs K either forward or backward (according to whether the shafts are to be raised or lowered) and adjusting the guides L accordingly.

It will be perceived that as I use a long semi-elliptic spring with its greater end in front of the axle, said spring connected with the rear of the body by C-springs and in front by torsion-springs, I am enabled to entirely counteract the jerking motion of the horse, and by the use of the shaft-springs I may accommodate the height of the cart to any size of horse and further aid in destroying the horse motion.

While I have heretofore spoken of rear C-springs, I may use long torsion-springs and connect them with the rear end of the semi-elliptic springs by arms E, and thus dispense with the C-springs with good results for certain styles of body, as shown in Fig. 3.

What I claim as new, and desire to secure by Letters Patent, is—

In a road-cart or sulky, the shafts pivoted to the axle, in combination with semi-elliptic springs adjustably clipped to the under side of the axle and adapted to support and adjust the shafts, as described.

In testimony that I claim the foregoing I have hereunto set my hand, on this 30th day of July, 1883, in the presence of two witnesses.

ABNER C. FISH.

Witnesses:
 S. S. STOUT,
 H. G. UNDERWOOD.